June 7, 1960
V. C. MOORE
2,939,340
TRANSMISSION
Filed Nov. 13, 1956
2 Sheets-Sheet 1
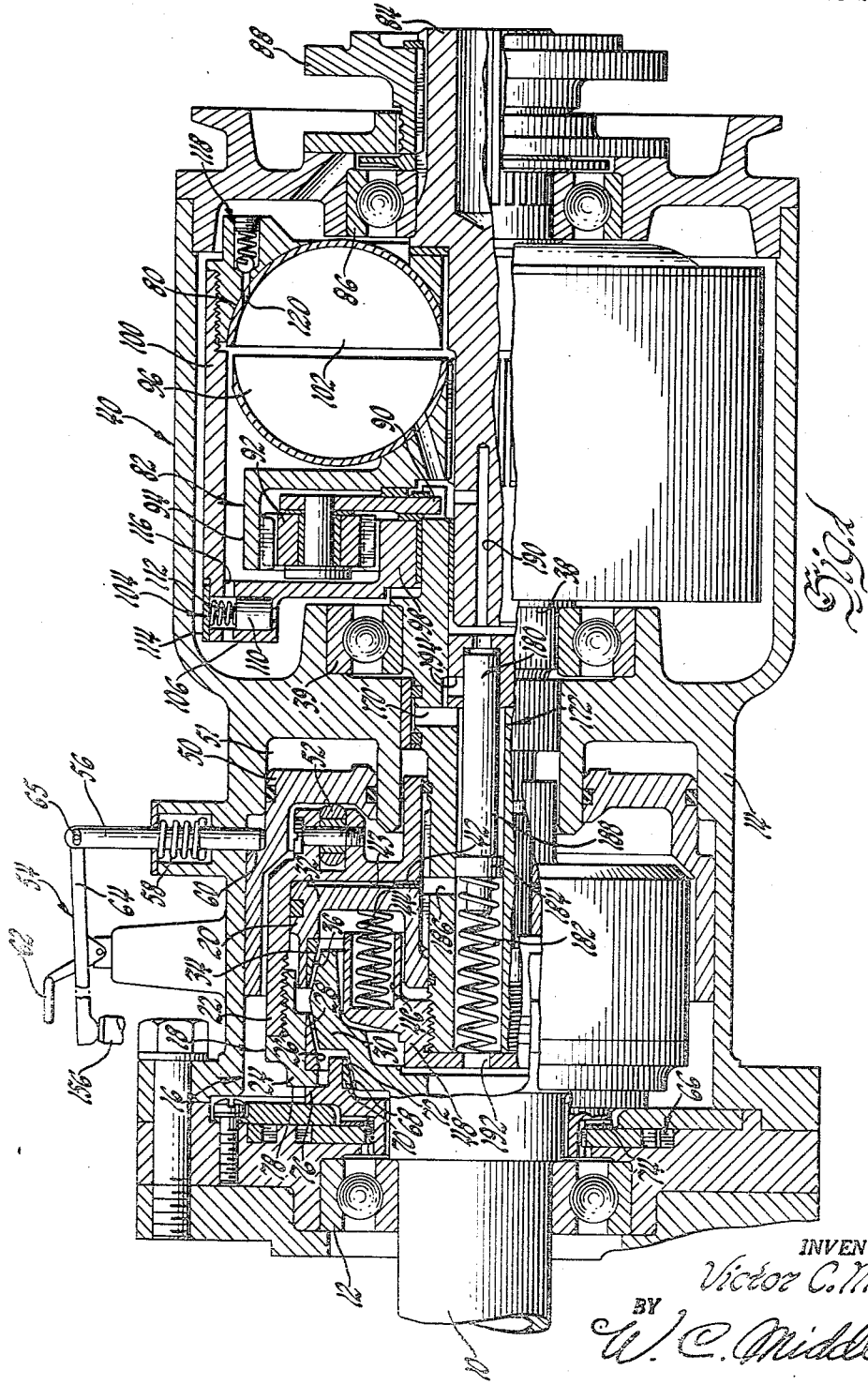
INVENTOR.
Victor C. Moore
BY
W. C. Middleton
ATTORNEY.

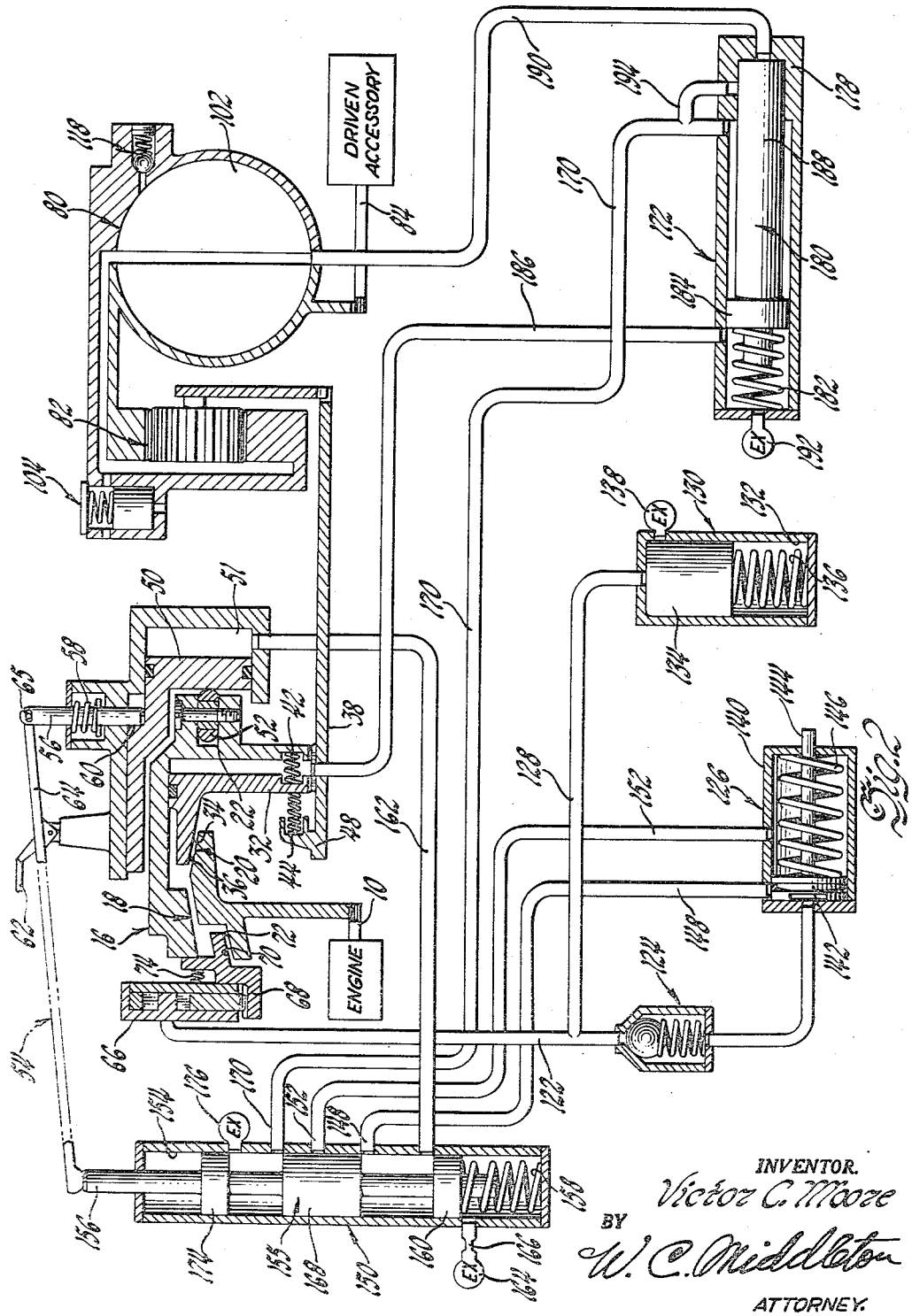

ized Patent Office 2,939,340
Patented June 7, 1960

2,939,340

TRANSMISSION

Victor C. Moore, Plymouth, Mich., assignor to General Motors Corporation, Detroit, Mich., a corporation of Delaware Filed Nov. 13, 1956, Ser. No. 621,562

36 Claims. (Cl. 74—677)

This invention relates to improvements in transmissions and particularly to transmissions adapted for intermittent drive.

In the transmission of power, it is frequently desirable to interrupt and re-establish drive conveniently with a minimum of equipment. For example, in aircraft it is the general practice to provide two sets of accessories, such as pumps, etc., so that one set will be readily available in the event of failure of the other. These two sets of accessories are driven continuously since there is provision only for interrupting and not for initiating drive during flight. After the driving engines have been stopped, as when on the ground, then drive can be again re-established. Consequently, there is additional power required to drive an extra accessory set, which is actually a loss, as well as the wear from constant drive.

To furnish a transmission suitable for this type aircraft application, the problem of space and weight is very critical. Therefore, the unit must be compact with a minimum of operating parts which have high torque capacities and adequate safety factors. Furthermore, the transmission must be capable of commencing drive smoothly despite a relatively high input speed.

With these considerations in mind, it is the purpose of this invention to provide a compact transmission having a high torque capacity and being capable of establishing drive smoothly with a very high input speed.

Further, the invention involves the use of a primary torque transmitting mechanism having a pair of drive establishing devices, one of which upon initiation of drive causes complete drive establishment by both devices. This torque transmitting mechanism upon becoming operative is combined with a secondary torque transmitting mechanism, preferably an overdriven hydrodynamic torque transmitting device, which then is rendered operative to pick up the load at some predetermined speed.

Specifically, the invention contemplates the use of a pressure fluid control system which is rendered operative upon commencement of engagement by one of a pair of fluid pressure operated drive establishing devices. Pressure fluid then completes engagement of both devices maintaining a relatively constant engagement pressure while filling a hydrodynamic drive device.

In an illustrative embodiment of the invention, a fluid pressure operated double cone clutch is combined through planetary gearing with a fluid coupling. A biasing means commences engagement of one of the cones rendering a pump operative to supply pressure fluid for the control system. Pressure fluid from the system then completes engagement of both cones maintaining a relatively constant engaging pressure while filling the coupling. After the double cone clutch is engaged, the planetary gearing becomes effective to overdrive the driving member of the coupling until a speed is attained sufficient to close a centrifugally operated coupling drain valve. As this drain valve closes, the coupling starts to gradually drive the load shaft and the overdrive effect from the gearing fades until the drive is substantially at a 1 to 1 ratio.

The foregoing and other objects and advantages of the invention will be apparent from the following description and from the accompanying drawings, in which:

Figure 1 is a sectional view of a transmission embodying the invention.

Figure 2 is a schematic control diagram for the Figure 1 transmission.

Structural arrangement

Referring to Figure 1, a driving means as driving shaft 10, connected to a prime mover or other source of power, is journaled by an anti-friction bearing 12 in a transmission housing 14. This driving shaft 10 transfers power to a primary torque transmitting mechanism 16 which includes a pair of pressure fluid operated devices, such as a first cone clutch 18 and a second cone clutch 20. In this embodiment, preferably double cones are employed to obtain maximum capacity while utilizing a minimum of space both radially and axially.

The first cone clutch 18 has a clutch drum 22 with a cone clutch element 24 attached to the forward end thereof. A cone surface 26 is provided on the cone clutch element 24 which is adapted to engage a complementary cone surface 28 on a peripheral crown portion 30 of the driving shaft 10. The second cone clutch 20 includes a cone clutch piston 32 having at the forward end a cone surface 34 mating with an adjacent complementary cone surface 36 also on the crown portion 30. Both the clutch drum 22 and the cone clutch piston 32 are slidably splined on an output or intermediate shaft 38. Shaft 38 is rotatably mounted by an anti-friction bearing 39 in the housing 14 and transfers drive to a secondary torque transmitting mechanism 40.

To urge the clutches 18 and 20 towards the engaged position, in a manner to be explained later, a clutch engaging spring 42 either of the wave or coil type is disposed within a fluid cavity 43 between the piston 32 and the drum 22 to urge the piston 32 and drum 22 apart. A plurality of clutch springs 44 are positioned in spring pockets 46 in a flange portion 48 of the intermediate shaft 38 to bias both the drum 22 and piston 32 rearwardly, tending to disengage the cone clutch 20 while urging the cone clutch 18 into engagement. Controlling movement of these clutches, as will be described hereinafter, is a pressure fluid operated piston 50 axially slidable within a chamber 51 formed integral with the housing 14. Due to the relative motion between the piston 50 and the rotating drum 22, a plurality of rollers 52, mounted on the drum 22, are provided for engaging the piston 50 and allowing free rotation of the drum.

To retain the piston 50 in the disengaged position illustrated by Figure 1, a locking mechanism 54 is utilized having a locking pin 56 spring biased to an engaged position by a locking spring 58. The pin 56, when moved downwardly by the spring 58, engages a locking shoulder 60 on the piston and prevents rearward clutch engaging movement of the piston. A manually operated handle 62 rotates a pivotally mounted lever 64 which has a pin connection with a slot 65 in the pin 56. The slot 65 allows the lever 64 to rotate while the locking pin 56 remains stationary. For instance, in the raised position of this handle 62, the spring 58 will urge the locking pin downwardly either against the locking shoulder 60 or against the periphery of the piston 50.

When it is desired to engage the torque transmitting mechanism 16, handle 62 is depressed releasing the locking mechanism 54. Then the springs 44 urge the piston 32 and the drum 22 rearwardly with the piston 50. Normally, pressure fluid in the chamber 51 retards this rearward movement of the piston 50 as will be explained.

Meanwhile, pressure fluid is supplied to the fluid cavity 43 to move the piston 32 forwardly to the engaged position, with the drum 22 at this time acting as a reaction member. That is, the piston 50 will have moved far enough so as to not interfere with rearward movement of the drum 22; consequently, the cone clutch 18 will start engagement while simultaneously providing reaction for engaging the cone clutch 22. The cone clutches are then engaged and transfer drive between the driving shaft 10 and the intermediate shaft 38.

To supply pressure fluid for the control system a suitable pump, as gear pump 66, is furnished forwardly of the mechanism 16. For driving the pump, a pump drive cone member 68 is journaled on the driving shaft 10 and includes a cone surface 70 which is formed to engage an adjacent cone surface 72 on the driving shaft 10. A pump starting spring 74 of either the wave or coil type constantly urges the cone member 68 rearwardly either to engage the cone surfaces 70 and 72 or maintain a shoulder 76 in engagement with a shoulder 78 on the cone clutch element 24 of the first cone clutch 18. Therefore, as soon as the drum 22 starts to move rearwardly during engaging movement, the spring 74 will be released by separation of the shoulders 76 and 78 and cause engagement of the cone surfaces 70 and 72 to start pumping action by the pump 66.

As an insurance for a smooth pick-up of the load, the secondary torque transmitting mechanism 40 is provided with a hydrodynamic drive device, such as fluid coupling 80, which coupling is driven by planetary gearing 82. The coupling transfers drive to a driven means as driven shaft 84 journaled by an anti-friction bearing 86 in the housing 14. An output drive flange 88 is splined on the driven shaft 84 for installation with an accessory or some other mechanism to be driven. The planetary gearing 82 comprises a planet carrier 90 connected to the intermediate shaft 38 and rotatably supporting a plurality of planet pinions 92. These pinions 92 intermesh with a reaction ring gear 94 secured to the coupling output member or turbine 96 and a sun gear 98 attached through a coupling drum 100 to the coupling input member or pump 102.

A centrifugally operated coupling drain valve 104 is employed which drains the coupling or fluid below some predetermined speed. This valve of which there are preferably two or more for dynamic balancing is formed as an offset section 106 of the drum 100 and includes a valve bore in which a valve member 110 is slidable. A control spring 112 engages a retainer plate 114 which closes the bore opening and biases the valve member 110 downwardly to a position in which a drain passage 116 from the coupling interior is opened to the exterior of the coupling. During operation, after a predetermined speed is attained by the drum 100, centrifugal force from the weight of the valve member 110 will be sufficient to overcome the spring 112 and cause the valve member to move upwardly and close the drain passage 116. The fluid coupling 80 then will fill and start to drive the driven shaft 84. Similarly, after drive is interrupted to the planetary gearing 82, the drum 100 will start to slow down until the valve member 110 is moved downwardly opening the drain passage 116. This condition will immediately drain the fluid coupling so that the next time drive is desired there will not be fluid in the coupling tending to create a drag which would interfere with the engagement of the cone clutch 18. By employing the coupling drain valve 104, the cone clutches 18 and 20 are always engaged without load, a very desirable feature since wear is considerably reduced.

A coupling pressure relief valve 118 of conventional ball check type is positioned for controlling a relief passage 120 in the input coupling member 102. The purpose of valve 118 is to provide constant flow through the coupling 80 to cool the coupling and to maintain a predetermined pressure therein.

Control system

When the pump 66 is operative as previously described, pressure fluid is supplied through a pump supply conduit 122 and a one-way check valve 124 to an accumulator 126. The function of this one-way check valve 124 is to prevent reverse flow from the system to the pump. A pressure relief branch conduit 128 extends from the conduit 122 to a pressure relief valve 130. The relief valve includes a valve chamber 132 having slidable therein a valve plunger 134 biased to the position illustrated by a spring 136. Relief valve 130 maintains the pressure in the system at a value determined by the spring 136. Whenever the pressure developed by the pump exceeds this value, an exhaust passage 138 is opened to relieve the excessive pressure.

The accumulator 126 provides a storage for pressure fluid which is used for an interval of cone clutch disengagement after the pump has ceased to operate as will be described later. The accumulator comprises a bored body 140 having slidable therein an accumulator piston 142 with a guide rod 144 attached thereto and biased to the position depicted by a spring 146. As pressure fluid received from the supply conduit 122 overcomes the spring 146, pressure fluid will be supplied through a conduit 148 to a manual control valve 150 and as the pressure further increases through a spaced conduit 152 also to the manual control valve 150.

As a control of clutch engagement and disengagement the manual control valve 150 is employed and comprises a valve chamber 154 with a manual valve element 155 having a valve stem 156 at the upper end and a spring 158 at the lower end for urging the valve element 155 to the position shown. The lever 62 for the locking mechanism 54 engages the stem 156 at the end opposite the locking pin 56. Hence, depression of the handle 62 by means of lever 64 disengages the locking pin and moves the manual control valve 150 downwardly from the position demonstrated. Subsequent raising of the handle 62 permits valve 150 to return to this position and causes the spring 58 to be compressed preparatory to forcing pin 56 into engagement with shoulder 60 on piston 50.

In the downward position of valve element 155, a bottom land 160 of the valve element opens a clutch release conduit 162 connected to the chamber 51 for the piston 50 to an exhaust passage 164 which has an orifice 166. Orifice 166 impedes the exhausting of the chamber 51 retarding rearward movement of the piston 50. An intermediate land 168 closes the conduit 148 from the accumulator and opens the conduit 152 from the accumulator to a clutch pressure control supply conduit 170 connected to a clutch pressure control valve 172. An upper land 174 on the manual valve element closes an exhaust passage 176 to conduit 170. In the upward position of the valve element the land 174 permits drainage of the passage 170 from the limiting valve 172.

The clutch pressure control valve 172 has a valve body 178 in which a valve element 180 is slidable and which is biased to the position illustrated by a spring 182 or the valve element 180 may be mounted in a bore within the intermediate shaft 38 as demonstrated in Figure 1. The valve element includes a land 184 adjacent a clutch supply conduit 186 and a stem portion 188 which controls a coupling supply conduit 190. When the cone clutches 18 and 20 are disengaged, the clutch supply passage 186 is relieved to an exhaust passage 192 in the spring end of the valve body 178. Pressure fluid supplied by the conduit 170 moves the valve element 180 to the left opening communication between conduit 170 and the supply conduit 186. As the pressure increases, the valve element 180 will move further and a branch 194 of the conduit 170 will be opened by the stem portion 188 permitting pressure fluid to be supplied to the coupling supply passage 190. This clutch pressure control valve then will maintain the pressure in the clutch supply conduit 186 relatively constant for a fixed cone clutch engagement pressure. For example, if when fill of the coupling is commenced pressure should drop excessively, then the clutch pressure control valve will close the coupling supply passage 190 until the pressure again builds up. As a result, the cone clutches are maintained engaged with a constant pressure during filling and operation of the coupling. Otherwise, slipping between the cone surfaces could result in the generation of heat and consequent wear of these surfaces.

Operation

To describe the operation of this transmission it will be assumed that initially the various operating units are in the Figure 1 and 2 positions and that accessories such as those employed in aircraft are to be driven. To initiate drive of the accessory the operator must depress the handle 62 for the locking mechanism 54. This movement will simultaneously disengage the locking pin 56 permitting piston 50 to move rearwardly from urging by both springs 44 and 74 and also move the manual control valve 150 downwardly. As the drum 22 moves rearwardly, the shoulder 76 on the pump drive cone member 68 and the shoulder 78 on cone clutch element 24 separate allowing the spring 74 to engage the cone surfaces 70 and 72 on the cone member 68 and driving shaft 10, respectively. The pump 66 will commence operation and supply pressure fluid which will move the piston 142 of the accumulator 126 to open first conduit 148 and then conduit 152 both to the manual control valve 150. Transfer of pressure fluid from conduit 148 is blocked by land 168 on the manual valve element 155, but is permitted between the conduits 152 and 170. It will be presumed that pressure fluid has remained in the chamber 51, i.e., the pressure fluid has not leaked from chamber 51 during extended periods of inoperativeness. The fluid from chamber 51 drains slowly through orifice 166 to exhaust passage 164 retarding rearward movement of the piston 50 and, accordingly the drum 22. By retarding the piston 50 the difference in engagement times for the clutches 18 and 20 is reduced. Pressure fluid proceeds through the manual control valve 150 and conduit 170 to the clutch pressure control valve 172 and from this valve through conduit 186 to the fluid cavity 43 urging the piston 32 and drum 22 apart. As cone clutch 18 commences engagement, reaction is provided for the cone clutch 20 so that both engage and drive the intermediate shaft 38. The clutch pressure control valve 172 now operates to maintain this engagement pressure constant while simultaneously directing pressure fluid from conduit 170 and branch 194 through the coupling supply conduit 190 to the fluid coupling 80. Pressure fluid in the coupling exhausts through the centrifugally operated coupling drain valve 104. As the intermediate shaft 38 acquires speed, the sun gear 98 is overdriven; that is, faster than the intermediate shaft and carrier, while the ring gear 94 remains stationary with the driven shaft 84. Eventually, this speed is sufficient to cause the coupling drain valve 104 to close so that pressure fluid commences to fill the coupling and establish drive between the input coupling member 102 and the output coupling member 96. Since, in general, the capacity of a fluid coupling is proportional to the square of the speed, the input coupling member 102 is overdriven to develop a greater speed and also a greater capacity. With this arrangement the size of the coupling both axially and radially can be decreased. Furthermore, the interconnecting of the fluid coupling 80 and planetary gearing 82 furnishes a split torque drive of the driven shaft 84 with a hydraulic portion proceeding through the fluid coupling and the remainder, mechanical, through the ring gear 94. As a result, a smaller coupling may be used despite the fact that reducing coupling size generally decreases coupling efficiency, the loss in efficiency being offset by the split torque arrangement and the initial overdriving of the fluid coupling 80. With the drain valve 104 closed, then the load on the output drive flange 88 from the accessories is progressively picked up smoothly. As the coupling 80 transmits torque, the overdriving effect from the gearing 82 gradually reduces until the pump 102 and turbine 96 rotate at substantially the same speed.

To disengage the cone clutches 18 and 20, the handle 62 is raised. The manual control valve then moves upwardly while the locking pin 56 for the locking mechanism 54 remains stationary against the periphery of piston 50. Pressure fluid is transferred from the pump 66 through conduits 122 and 148, between the lands 160 and 168, through the clutch release conduit 162 to chamber 51. Pressure fluid in chamber 51 moves piston 50 forwardly until the pin 56 engages the shoulder 60. Also, the land 168 of the manual control valve 150 opens the supply conduit to the clutch pressure control valve 172 to the exhaust passage 176. As piston 50 moves forwardly, the drum 22 is moved forwardly to disengage the engaged cone clutch 18 and also the pump drive cone member 68 is moved forwardly by the engagement of the shoulder 76 and 78 to interrupt drive of the pump. Cone clutch 20 is disengaged by springs 44 when pressure fluid in cavity 43 is drained through valve 172 to the exhaust passage 192. With the pump 66 inoperative the accumulator is employed to ensure that the piston is entirely disengaged; that is, if the pump should stop operating prior to complete disengagement of the cone clutches by the piston 50 then the cone clutches could re-engage. The entire volume of pressure fluid in the accumulator is made available through conduits 148 and 162, after conduit 152 is closed, to continue disengaging movement of the piston 50. Upon interruption of drive by the cone clutches 18 and 20, the fluid coupling will slow down until the centrifugally operated coupling drain valve 104 opens, at which time the coupling will be drained of pressure fluid. The transmission is now fully disengaged and prepared to be re-engaged as aforementioned.

From the foregoing it is apparent that this transmission is especially suited for installations such as aircraft accessory drives having limited space provisions and requiring the smooth initiation of drive of substantially large loads. Double cone clutches, which need a minimum of space, are employed to obtain a maximum torque capacity and are initially engaged to overdrive through gearing a fluid coupling. As a result, the size of the coupling is decreased while the initial torque capacity is increased. Also, by utilizing a split torque drive to the output through the gearing and the fluid coupling, the efficiency of the drive is increased. The fluid coupling is then utilized to achieve a smooth gradual start of drive only after the cone clutches have been fully engaged. Furthermore, during periods of idleness, none of the transmission parts are operating to waste power.

I claim:

1. In a transmission, the combination comprising, driving and driven means, primary and secondary torque transmitting mechanisms interconnected to transfer drive between said driving and driven means, said primary torque transmitting mechanism including first and second drive establishing devices, each device affording a separate and parallel drive path between the driving means and the secondary torque transmitting mechanism, and actuating means operative upon initiation of drive establishment by said first drive establishing device to complete drive establishment of said first drive establishing device and render said second drive establishing device operative to also establish drive, and means associated with said primary torque transmitting mechanism for establishing drive through said secondary torque transmitting mechanism after completion of drive establishment through said primary torque transmitting mechanism.

2. In a transmission, the combination comprising, driving and driven means, primary and secondary torque transmitting mechanisms interconnected to transfer drive between said driving and driven means, said primary torque transmitting mechanism including first and second pressure fluid operated devices for establishing parallel and separate drive paths between said driving means and said secondary torque transmitting mechanism, biasing means for initiating drive establishment of said first pressure fluid operated device, a source of pressure fluid rendered operative upon initiation of drive establishment by said first pressure fluid operated device, the pressure fluid from said source completing drive establishment of said first pressure fluid operated device while effecting drive establishment of said second pressure fluid operated device, and means associated with said primary torque transmitting mechanism for establishing drive through said secondary torque transmitting mechanism after completion of drive establishment through said primary torque transmitting mechanism.

3. In a transmission, the combination comprising, driving and driven means, primary and secondary torque transmitting mechanisms interconnected to transfer drive between said driving and driven means, said primary torque transmitting mechanism including first and second pressure fluid operated devices for establishing parallel and separate drive paths between said driving means and said secondary torque transmitting mechanism, a source of pressure fluid, biasing means for initiating drive establishment of said first pressure fluid operated device and rendering said source of pressure fluid operative, retarding means for delaying complete drive establishment of said first pressure fluid operated device so that drive establishment through said first and second pressure operated device can be accomplished together by pressure fluid from said source, and means associated with said primary torque transmitting mechanism for establishing drive through said secondary torque transmitting mechanism after completion of drive establishment through said primary torque transmitting mechanism.

4. In a transmission, the combination comprising, driving and driven means, primary and secondary torque transmitting mechanisms interconnected to transfer drive between said driving and driven means, said primary torque transmitting mechanism including first and second pressure fluid operated friction devices, a pump for supplying pressure fluid to said first and second pressure fluid operated friction devices, means for driving said pump, biasing means for initiating drive establishment of said first friction device and rendering said pump driving means operative, retarding means for delaying drive establishment of said first friction device, the pressure fluid from said pump effecting drive establishment of said second friction device simultaneously with completion of drive establishment of said first friction device after the delay provided by said retarding means, and means associated with said primary torque transmitting mechanism for establishing drive through said secondary torque transmitting mechanism after completion of drive establishment through said primary torque transmitting mechanism.

5. In a transmission, the combination comprising, driving and driven means, a pressure fluid operated torque transmitting device connected to said driving means, a hydrodynamic drive device including an input member connected to said pressure fluid operated device and an output member connected to said driven means, a pump, means for driving said pump, means for initiating drive establishment of said pressure fluid operated device and for rendering said pump driving means operative, and control means for supplying pressure fluid from said pump to said pressure fluid operated device to complete drive establishment and supply pressure fluid for rendering said hydrodynamic drive device operative.

6. In a transmission, the combination comprising, driving and driven means, a pressure fluid operated torque transmitting device connected to said driving means, a hydrodynamic drive device including an input member connected to said pressure fluid operated device and an output member connected to said driven means, a pump, means for driving said pump, means for initiating drive establishment by said pressure fluid operated device and for rendering said pump driving means operative, and control means for supplying pressure fluid from said pump to said pressure fluid operated device to complete drive establishment thereof and supplying pressure fluid for rendering said hydrodynamic drive device operative, and means for preventing drive establishment by said hydrodynamic drive device until a predetermined speed is attained by said input member.

7. In a transmission, the combination comprising, driving and driven means, a torque transmitting mechanism connected to said driving means, a hydrodynamic drive device including an input member and an output member, said output member being connected to said driven means, gearing means interconnecting said input member and said torque transmitting mechanism for driving said input member at some predetermined speed relative to the speed of said driving means, and means associated with said torque transmitting mechanism for supplying pressure fluid to said hydrodynamic drive device to establish drive therethrough after completion of drive establishment through said torque transmitting mechanism.

8. In a transmission, the combination comprising, driving and driven means, a pressure fluid operated torque transmitting device connected to said driving means, a hydrodynamic drive device including an input member and an output member, said output member being connected to said driven means, gearing means interconnecting said input member and said pressure fluid operated torque transmitting device for overdriving said input member relative to said driving means, and control means for supplying pressure fluid to said hydrodynamic drive device after drive establishment by said pressure fluid operated torque transmitting device.

9. In a transmission, the combination comprising, driving and driven means, first and second pressure fluid operated friction devices, a pump for supplying pressure fluid to said first and second friction devices, means for driving said pump, biasing means for initiating drive establishment of said first friction device and rendering said pump driving means operative, retarding means for delaying drive establishment by said first friction device, the pressure fluid from said pump effecting drive establishment of said second friction device while completing drive establishment of said first friction device after the delay provided by said retarding means, a hydrodynamic drive device including an input member and an output member connected to said driven means, planetary gearing including a reaction element connected to said output member, a driving element connected to said first and second friction devices, and a driven element connected to said input member, and control means for supplying pressure fluid from said pump to said pressure fluid operated device to complete drive establishment and subsequently supply pressure fluid for rendering said hydrodynamic drive device operative.

10. In a transmission, the combination comprising, a driving shaft, a driven shaft, first and second pressure fluid operated clutches for transferring drive from said driving shaft, a supply pump for providing pressure fluid, means for driving said pump, biasing means for rendering said supply pump driving means operative and starting engagement of said first clutch, a fluid coupling including a pump connected to each of said clutches and a turbine connected to said driven shaft, locking mechanism movable to and from a locking position for preventing engagement of said clutches, and control valve means operative upon movement of said locking mechanism from said locking position to control and direct pressure fluid from said supply pump to said clutches for completing engagement of said first clutch and engaging said second clutch and directing pressure fluid for filling said fluid coupling, said control valve means maintaining the pressure of the pressure fluid directed to said clutches substantially constant during filling of said coupling.

11. In a transmission, the combination comprising, a driving shaft, a driven shaft, first and second pressure fluid operated clutches for transferring drive from said driving shaft, a supply pump for providing pressure fluid, means for driving said pump, biasing means for rendering said supply pump driving means operative and starting engagement of said first clutch, planetary gearing having an input element connected to both of said clutches, an output element and a reaction element, a fluid coupling including a pump member connected to said output element for said gearing and a turbine member interconnected with said driven shaft and said reaction element, a clutch pressure control valve for controlling and directing pressure fluid to said clutches for completing engagement of said first clutch and engaging said second clutch, said clutch pressure control valve directing pressure fluid to said fluid coupling while maintaining the pressure of the pressure fluid directed to said clutches constant, and a centrifugally operated valve installed on one of said coupling members for draining said coupling below a predetermined speed of said coupling member on which said centrifugally operated valve is installed.

12. In a transmission, the combination comprising, a driving shaft, a driven shaft, first and second pressure fluid operated clutches for transferring drive from said driving shaft, a supply pump for providing pressure fluid, a pump clutch for driving said supply pump from said driving shaft, said pump clutch being disengaged by movement of said first clutch to a disengaged position, locking mechanism movable to and from a locking position for preventing engagement of said clutches, biasing means for engaging said pump clutch and urging said first clutch to an engaged position upon movement of said locking mechanism from the locking position, planetary gearing having an input element connected to both of said first and second clutches, an output element and a reaction element, a fluid coupling including a pump connected to said output element for said gearing and a turbine interconnected with said driven shaft and said reaction element, and control valve means operative upon movement of said locking mechanism from said locking position for controlling and directing pressure fluid from said supply pump to said clutches to complete engagement of said first clutch and engage said second clutch and directing pressure fluid for filling said fluid coupling, said control valve means maintaining the pressure of pressure fluid directed to said clutches substantially constant while filling said coupling.

13. In a transmission, the combination comprising, a driving shaft, a driven shaft, first and second pressure fluid operated clutches for transferring drive from said driving shaft to an intermediate shaft, a supply pump for providing pressure fluid, means for driving said pump, biasing means for rendering said supply pump driving means operative and starting engagement of said first clutch, planetary gearing having an input element connected to said intermediate shaft, an output element and a reaction element, a fluid coupling including a pump connected to said output element for said gearing and a turbine interconnected with said driven shaft and said reaction element, locking mechanism movable to and from a locking position in which engagement of said clutches is prevented, a clutch pressure control valve for controlling and directing pressure fluid to said clutches for completing engagement of said first clutch and engaging said second clutch, said clutch pressure control valve directing pressure fluid to said fluid coupling while maintaining the pressure of pressure fluid directed to said clutches constant and a control valve interposed between said supply pump and said clutch pressure control valve and coacting with said locking mechanism when moved from the locking position to direct pressure fluid from said supply pump to said clutch pressure control valve.

14. In a transmission, the combination comprising, a driving shaft, a driven shaft, first and second pressure fluid operated clutches for transferring drive from said driving shaft to an intermediate shaft, a supply pump for providing pressure fluid, a pump clutch interposed between said supply pump and said driving shaft for transferring drive therebetween, said pump clutch being disengaged by movement of said first clutch to a disengaged position, biasing means for engaging said pump clutch and urging said first clutch to the engaged position upon movement of said locking mechanism from the locking position, planetary gearing having an input element connected to said intermediate shaft, an output element and a reaction element, a fluid coupling including a pump connected to said output element for said gearing and a turbine interconnected with said driven shaft and said reaction element, said gearing being arranged to overdrive said coupling pump during commencement of drive of said fluid coupling, manually operated locking mechanism movable to and from a locking position in which engagement of said clutches is prevented, a clutch pressure control valve for controlling and directing pressure fluid to said clutches for completing engagement of said first clutch and engaging said second clutch, said clutch pressure control valve directing pressure fluid to said fluid coupling while maintaining the pressure of pressure fluid directed to said clutches constant, a control valve interposed between said supply pump and said clutch pressure control valve and coacting with said manually operated locking mechanism when moved from the locking position to direct pressure fluid from said supply pump to said clutch pressure control valve, said control valve retarding disengagement of said clutches and a centrifugally operated valve for draining said coupling below a predetermined speed.

15. A mechanism for transmitting torque comprising, in combination, driving and driven members, first and second pressure fluid operated devices for establishing parallel and separate drive paths between said members, a pressure fluid pump, means both for initiating drive establishment of said first pressure fluid operated device and for rendering said pressure fluid pump operative, said pressure fluid from said pump completing drive establishment of said first pressure fluid operated device while effecting drive establishment by said second pressure fluid operated device.

16. A mechanism for transmitting torque comprising, in combination, driving and driven members, first and second pressure fluid operated friction devices, a pump for supplying pressure fluid to said first and second friction devices, means for driving said pump, biasing means for initiating drive establishment of said first friction device and simultaneously rendering said pump driving means operative to supply pressure fluid, retarding means for delaying drive establishment by said first friction device, the pressure fluid from said pump effecting drive establishment of said second friction device while completing drive establishment of said first friction device after the delay provided by said retarding means.

17. A mechanism for transmitting torque comprising, in combination, a driving shaft, a driven shaft, first and second pressure fluid operated clutches for transferring drive between said shafts, biasing means urging said first clutch toward an engaged position and said second clutch toward a disengaged position, a pressure fluid supply pump, means for driving said pump, the pump driving means being rendered operative by said biasing means, and a control valve for delivering pressure fluid from said pump to engage said clutches.

18. A mechanism for transmitting torque comprising, in combination, a driving shaft, a driven shaft, first and second pressure fluid operated clutches for transferring drive between said shafts, biasing means urging said first clutch toward an engaged position and said second clutch toward a disengaged position, locking mechanism movable to and from a locking position in which engagement of said clutches is prevented, a pressure fluid supply pump, a pump drive clutch engageable by said biasing means when said locking mechanism is moved from the locking position to drive said pump from said driving shaft, and a control valve actuated by said locking mechanism when moved from the locking position to direct pressure fluid from said pump to engage said clutches.

19. A mechanism for transmitting torque comprising, in combination, a driving shaft, a driven shaft, first and second pressure fluid operated clutches, biasing means urging said first clutch toward an engaged position and said second clutch toward a disengaged position, locking mechanism movable to and from a locking position in which engagement of said clutches is prevented, a pressure fluid supply pump, a pump drive clutch engageable by said biasing means when said locking mechanism is moved from the locking position to drive said pump from said drive shaft, a control valve actuated by said locking mechanism when moved from the locking position to direct pressure fluid from said pump to engage said clutches in one position and retard relief of pressure from said clutches in another position in which pressure fluid supply to said clutches is interrupted and the clutches are disengaged, and a clutch pressure control valve for controlling the pressure of fluid supplied to said clutches.

20. A mechanism for transmitting torque comprising, in combination, a driving shaft, a driven shaft, first and second friction clutches for transferring drive between said driving and driven shafts, a chamber provided between said clutches for pressure fluid, biasing means urging said first clutch toward an engaged position and said second clutch toward a disengaged position, locking mechanism movable to and from a locking position in which engagement of said clutches is prevented, a pressure fluid supply pump, a pump drive clutch engageable by said biasing means when said locking mechanism is moved from the locking position to drive said pump from said drive shaft, a control valve actuated by said locking mechanism when moved from the locking position to direct pressure fluid from said pump to said chamber to engage said clutches, said first clutch providing reaction for said second clutch during engagement of said clutches by pressure fluid.

21. A mechanism for transmitting torque comprising, in combination, a driving shaft, a driven shaft, first and second friction clutches for transferring drive between said driving and driven shafts, a chamber provided between said clutches for pressure fluid, biasing means urging said first clutch toward an engaged position and said second clutch toward a disengaged position, locking mechanism movable to and from a locking position in which engagement of said clutches is prevented, a pressure fluid supply pump, a pump drive clutch engageable by said biasing means when said locking mechanism is moved from the locking position to drive said pump from said driving shaft, a control valve actuated by said locking mechanism when moved from the locking position to direct pressure fluid from said pump to said chamber to engage said clutches and a pressure fluid operated piston for disengaging said clutches and said pump drive clutch.

22. A mechanism for transmitting torque comprising, in combination, a driving shaft, a driven shaft, first and second pressure fluid operated cone clutches for transferring drive between said driving and driven shafts, a chamber provided between said clutches for pressure fluid, biasing means urging said first clutch toward an engaged position and said second clutch toward a disengaged position, locking mechanism movable to and from a locking position in which engagement of said clutches is prevented, a pressure fluid supply pump, a pump drive clutch engageable by said biasing means when said locking mechanism is moved from the locking position to drive said pump from said driving shaft, a control valve actuated by said locking mechanism when moved from the locking position to direct pressure fluid from said pump to said chamber to engage said clutches, said first clutch providing reaction for said second clutch during engagement of said clutches by pressure fluid, and a pressure fluid operated piston for disengaging said clutches and said pump drive clutch.

23. In a control system, the combination comprising, primary and secondary pressure fluid operated drive establishing mechanisms, a source of pressure fluid, and valve means for transferring pressure fluid from said source to said primary and secondary mechanisms to establish drive therethrough, said valve means being arranged to transfer pressure fluid initially to said primary mechanism and thereafter maintain the pressure of fluid supplied to said primary mechanism relatively constant while transferring pressure fluid to said secondary mechanism.

24. In a control system, the combination comprising, primary and secondary pressure operated drive establishing mechanisms, a source of pressure fluid and a control valve for supplying pressure fluid from said source initially to said primary mechanism and to said secondary mechanism, said control valve maintaining the fluid pressure supplied to primary mechanism relatively constant while supplying said secondary mechanism.

25. In a control system for maintaining pressure fluid supplied to a pressure fluid operated clutch constant while filling a fluid coupling, the combination comprising, a source of pressure fluid, a valve body having a bore therein, an inlet conduit from said source and spaced clutch supply and fluid coupling supply outlet conduits, a pressure control valve slidable in said bore to and from a position closing said outlet conduits, biasing means urging said valve toward said position closing said outlet conduits, said valve being arranged to transfer pressure fluid from said source to said clutch supply outlet conduit at a substantially constant pressure and relieve excess pressure fluid to said fluid coupling supply outlet conduit for filling said coupling.

26. In a control system for maintaining pressure fluid supplied to a pressure fluid operated clutch constant while filling a fluid coupling, the combination comprising, a source of pressure fluid, a valve body having first and second aligned bores, a clutch supply outlet conduit opening into the first of said bores, a fluid coupling supply outlet conduit opening into the second of said bores and an inlet conduit from said source opening into the first of said bores and having a branch opening into the second of said bores, a pressure control valve having lands slidable in said bores, biasing means urging said valve toward an inoperative position, said valve being arranged to be moved by pressure fluid from said inlet conduit in opposition to said biasing means to an operative position in which said clutch supply outlet conduit is initially open to communication with said inlet conduit and subsequently said fluid coupling outlet conduit is open to communication with said branch of said inlet conduit while maintaining pressure fluid in said clutch supply outlet conduit relatively constant.

27. In a control system for maintaining pressure fluid supplied to a pressure fluid operated clutch constant while filling a fluid coupling, the combination comprising, a source of pressure fluid, a valve body having first and

13 second aligned bores, a relief passage, a clutch supply outlet conduit opening into the first of said bores, a fluid coupling supply outlet conduit opening into the second of said bores and an inlet conduit from said source opening into the first of said bores and having a branch opening into the second of said bores, a pressure control valve having lands slidable in said bores, said valve in an inoperative position allowing pressure fluid from said clutch to drain from said clutch supply outlet conduit to said relief passage, biasing means urging said valve toward said inoperative position, said valve being arranged to be moved by pressure fluid from said inlet conduit in opposition to said biasing means to an operative position in which said clutch supply outlet conduit is initially open to communication with said inlet conduit by one of said lands on said valve and subsequently said fluid coupling outlet conduit is open to communication with said branch of said inlet conduit by the other of said lands on said valve while maintaining pressure fluid in said clutch supply outlet conduit relatively constant.

28. In a control system for a pressure fluid operated drive establishing mechanism, the combination comprising, a source of pressure fluid, means associated with said mechanism for rendering said source of pressure fluid operative upon initiation of drive establishment by said mechanism and inoperative upon interruption of drive establishment by said mechanism, control means for supplying pressure fluid from said source for interrupting drive establishment of said mechanism and supplemental means for supplying pressure fluid to continue interruption of drive establishment by said mechanism after said source becomes inoperative.

29. In a control system for a pressure fluid operated drive establishing mechanism, the combination comprising, a pump for supplying pressure fluid, means associated with said mechanism for rendering said pump operative upon initiation of drive establishment by said mechanism and inoperative upon interruption of drive establishment by said mechanism, control means for supplying pressure fluid from said pump for interrupting drive establishment of said mechanism and a reservoir for storing pressure fluid to be utilized in maintaining interruption of drive establishment by said mechanism after said pump becomes inoperative.

30. In a control system for a pressure fluid disengaged device, the combination comprising, a pump for supplying pressure fluid for disengaging said device, means for rendering said pump inoperative upon starting disengagement of said device, and an accumulator interposed between said pump and said device operative upon discharge to supply pressure fluid to said device to insure a complete disengagement after said pump becomes inoperative.

31. In a control system for a pressure fluid disengaged clutch, the combination comprising, a pump for supplying pressure fluid for disengaging said clutch, a pump drive member coacting with said clutch for rendering said pump inoperative upon starting disengagement of said clutch, an accumulator interconnected with said pump and said clutch for storing a predetermined volume of pressure fluid, biasing means for discharging pressure fluid from said accumulator after said pump becomes inoperative to continue pressure fluid disengagement of said clutch.

32. In a control system for a clutch arranged to be disengaged by a pressure fluid operated clutch piston, the combination comprising, a pressure fluid supply pump, a pump drive member coacting with said clutch for rendering said pump inoperative upon starting disengagement of said clutch, an accumulator including a body having a bore therein, an accumulator piston slidable in said bore, an inlet conduit from said pump and an outlet conduit to said piston and biasing means for urging said accumulator piston to a position interrupting communication between said inlet and outlet conduits, said piston being displaced by pressure fluid from said pump when

14 operative to provide a reserve of pressure fluid for discharge through said outlet conduit to said clutch piston for completing disengagement of said clutch when said pump becomes inoperative.

33. In a control system for operating a torque transmitting mechanism, the combination comprising, locking mechanism movable to a locking position for preventing engagement of said torque transmitting mechanism and to an unlocked position for permitting engagement of said torque transmitting mechanism, a source of pressure fluid, and control valve means coacting with said locking mechanism in the locking position to provide pressure fluid from said source for disengaging said torque transmitting mechanism and in the unlocked position to provide pressure fluid from said source for engaging said torque transmitting mechanism.

34. In a control system for operating a torque transmitting mechanism, the combination comprising, locking mechanism movable to a locking position for preventing engagement of said torque transmitting mechanism and to an unlocked position for permitting engagement of said torque transmitting mechanism, a source of pressure fluid, and control valve means coacting with said locking mechanism in the locking position to provide pressure fluid from said source for disengaging said torque transmitting mechanism and in the unlocked position to provide pressure fluid from said source for engaging said torque transmitting mechanism, and retarding means associated with said valve means for delaying engagement of said torque transmitting mechanism.

35. In a control system for operating a clutch, the combination comprising, locking mechanism movable to a locking position for preventing engagement of said clutch and to an unlocked position for permitting engagement of said clutch, a source of pressure fluid, a valve body having a bore therein, an inlet conduit from said source, a clutch apply conduit for supplying pressure fluid for engaging said clutch, a clutch release conduit for supplying pressure fluid for disengaging said clutch, and a control valve slidable in said bore and coacting with said locking mechanism, said valve being arranged in a locking position of said locking mechanism to direct pressure fluid from said inlet conduit to said clutch release conduit for disengaging said clutch, and in the unlocked position of said locking mechanism to direct pressure fluid from said inlet conduit to said clutch apply conduit to engage said clutch.

36. In a control system for operating a clutch, the combination comprising, locking mechanism movable to a locking position for preventing engagement of said clutch and to an unlocked position for permitting engagement of said clutch, a source of pressure fluid, a valve body having a bore therein, an inlet conduit from said source, a clutch apply conduit for supplying pressure fluid for engaging said clutch, a clutch release conduit for supplying pressure fluid for disengaging said clutch, a relief passage having an orifice therein, a control valve slidable in said bore and coacting with said locking mechanism, said valve being arranged in the locking position of said locking mechanism to direct pressure fluid from said inlet conduit to said clutch release conduit for disengaging said clutch, and in the unlocked position of said locking mechanism to direct pressure fluid from said inlet conduit to said clutch apply conduit for engaging said clutch and to direct pressure fluid from said clutch release conduit through said orifice and said relief passage for retarding engagement of said clutch.

References Cited in the file of this patent

UNITED STATES PATENTS

| | | |
|---|---|---|
| 885,323 | Common | Apr. 21, 1908 |
| 2,093,236 | Dodge et al. | Sept. 14, 1937 |
| 2,260,846 | Voytech | Oct. 28, 1941 |

(Other references on following page)

UNITED STATES PATENTS

| | | |
|---|---|---|
| 2,324,733 | Smirl | July 20, 1943 |
| 2,502,798 | Nabstedt et al. | Apr. 4, 1950 |
| 2,544,551 | Black | Mar. 6, 1951 |
| 2,603,327 | King | July 15, 1952 |
| 2,633,954 | Allen | Apr. 7, 1953 |
| 2,642,167 | Brown | June 16, 1953 |
| 2,644,535 | Koup et al. | July 7, 1953 |
| 2,671,543 | Bosch | Mar. 9, 1954 |
| 2,674,905 | O'Brien | Apr. 13, 1954 |
| 2,723,737 | Hammell et al. | Nov. 15, 1955 |
| 2,726,513 | McWethey et al. | Dec. 13, 1955 |
| 2,794,349 | Smirl | June 4, 1957 |

FOREIGN PATENTS

| | | |
|---|---|---|
| 1,112,416 | France | Nov. 16, 1955 |